United States Patent [19]

Latapie

[11] Patent Number: 4,459,958
[45] Date of Patent: Jul. 17, 1984

[54] ELECTRONIC DEVICE RECEIVING AN IGNITION SIGNAL FROM AN INTERNAL COMBUSTION ENGINE AND SUPPLYING A SIGNAL POSITIONED IN RELATION TO TOP DEAD CENTER

[75] Inventor: Jean-François Latapie, Roquettes, France

[73] Assignee: Equipements Automobiles Marchal, Issy-les-Moulineaux, France

[21] Appl. No.: 406,790

[22] Filed: Aug. 10, 1982

[30] Foreign Application Priority Data

Aug. 11, 1981 [FR] France ............................... 81 15541

[51] Int. Cl.$^3$ .............................................. F02P 5/04
[52] U.S. Cl. ....................................... 123/425; 73/35; 123/415
[58] Field of Search ...................... 123/425, 415; 73/35

[56] References Cited

U.S. PATENT DOCUMENTS 3,777,559 12/1973 Rennick et al. ..................... 73/117.3
3,942,359 3/1976 Arrigoni et al. ......................... 73/35
4,002,155 1/1977 Harned et al. ........................... 73/35
4,249,494 2/1981 Guipaud ................................. 73/35
4,279,143 7/1981 Guipaud .............................. 123/425

FOREIGN PATENT DOCUMENTS 0018858 10/1980 European Pat. Off. ............. 123/425

2337261 12/1975 France .

Primary Examiner—Parshotam S. Lall
Attorney, Agent, or Firm—Brisebois & Kruger

[57] ABSTRACT

An electronic device for briefly enabling an "anti-pinging" vibration detector used for controlling the ignition timing of an internal combustion engine to advance the generated ignition signal in each cycle in relation to the top dead center point of the piston on compression stroke, by a value which is variable according to the engine speed of rotation, receives an input signal and supplies a periodic "detector active" signal whose start and finish are, in each period, positioned in relation to the top dead center in said cylinder with a predetermined error margin. The device comprises a first stage effective to supply a "detector enabling" signal which defines the start of said "detector active" signal with a first time shift in relation to said input signal and a second stage effective to receive the said "detector enabling" signal from said first stage and to generate a "detector disabling" signal which defines the finish of said "detector active" signal with a second time shift in relation to said input signal. The "detector enabling" signal supplied by said first stage is displaced in relation to said input signal by an interval which is the sum of a constant first interval and of a second interval which corresponds to a constant angle of engine rotation.

11 Claims, 5 Drawing Figures

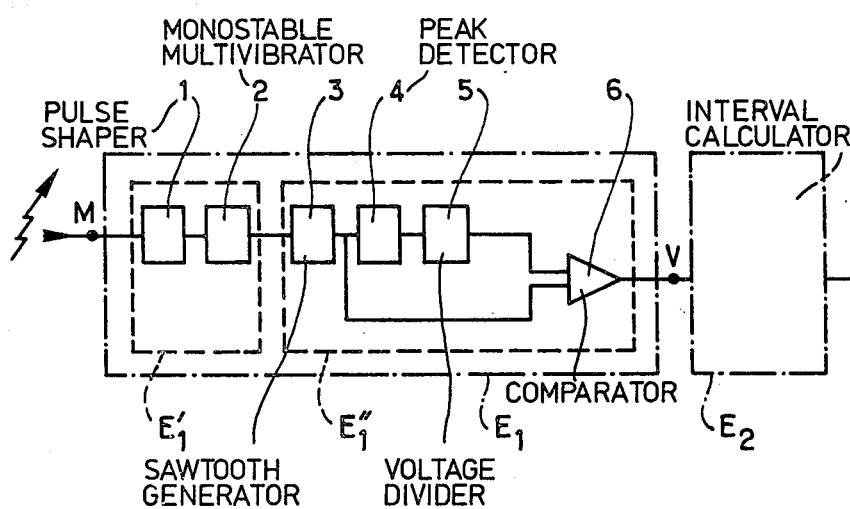
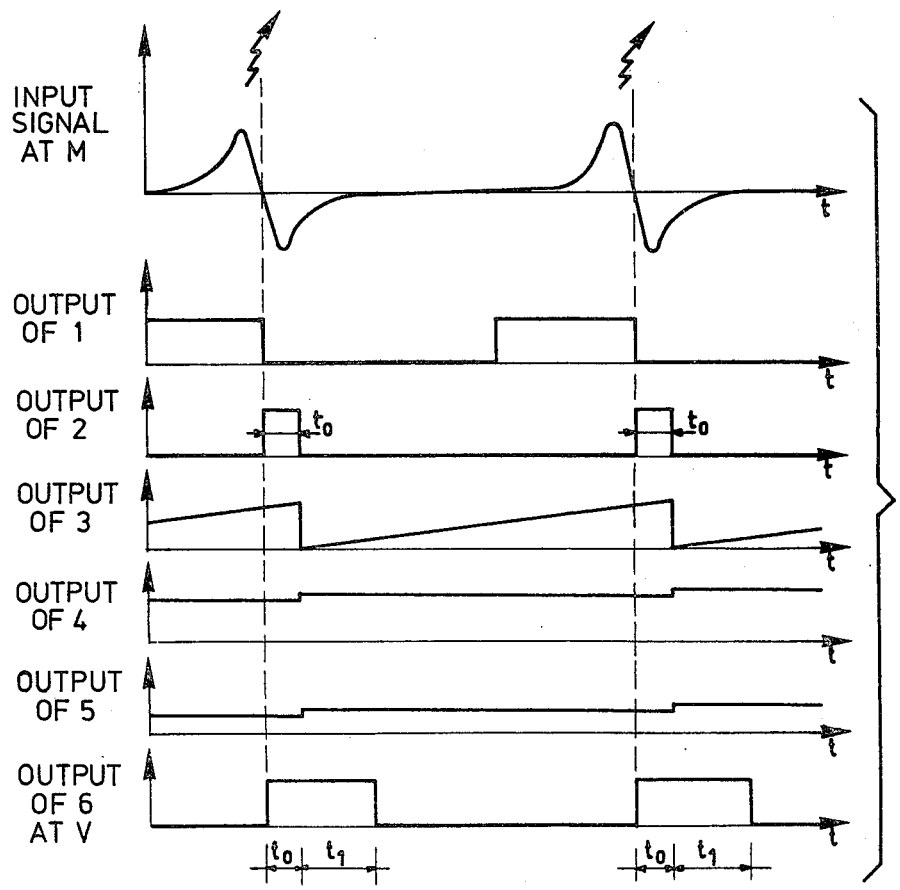

ELECTRONIC DEVICE RECEIVING AN IGNITION SIGNAL FROM AN INTERNAL COMBUSTION ENGINE AND SUPPLYING A SIGNAL POSITIONED IN RELATION TO TOP DEAD CENTER

FIELD OF THE INVENTION

The present invention relates to an electronic device intended to be used in combination with the devices allowing the ignition to be advanced and retarded in the cylinders of an internal combustion engine. More particularly, the invention concerns an electronic device allowing a vibration detector to be put into operation during an angular range of rotation of an internal combustion engine with a view to detecting possible pinging in a cylinder in the course of the said angular range.

PRIOR ART

It is known that, in order to ensure a satisfactory functioning of an internal combustion engine, a distributor is called for whose rotor shaft is driven by the engine; this distributor supplies an ignition signal which releases the discharge of an ignition coil on that one of the sparking plugs of the engine which has to be supplied with a high voltage current. The ignition signal is emitted with a time shift in relation to the arrival at the top dead centre point of the piston in the cylinder which is on the compression stroke and where ignition has to occur. The timing of the ignition signal depends on the speed of rotation, according to a given characteristic curve, and generation of the ignition signal requires the presence of a sensor in the distributor, whose moving part is driven by the rotor shaft of the distributor and which is subjected to angular shifts allowing the required timing advance shift to be generated in the ignition.

It is, moreover, known that in certain conditions, the functioning of an internal combustion engine gives rise to a pinging phenomenon which corresponds to highly undesirable vibrations in the regions of the piston level. When endeavouring to improve the engine efficiency with a systematic reference to the maximum torque curve, there is a risk of onset of the phenomenon of pinging under certain operating conditions. It has therefore been considered that identifying the occurrence of the pinging phenomenon and consequently reducing the value of the ignition timing advance only at that moment of setting the engine a maximum torque operation, as long as the pinging phenomenon has not occurred, will give improved operation. To do this requires a vibration detector positioned on the engine block for identifying the occurrence of pinging which corresponds to frequencies of approximately 8 KHz. Such a detector is associated with a band pass filter to eliminate the base noise but, to avoid any inopportune intervention of the detector, its operating time is reduced to that fraction of the operating cycle when there is a susceptibility to the occurrence of pinging. It has in fact been found that the pinging phenomenon only occurs, in the operating cycle of a cylinder, during the commencement of the power stroke and more precisely, in an angular range of up to approximately 30° after the top dead centre (location on the crankshaft rotation). It will therefore be seen that it is advisable to make it possible to trigger the pinging detector by means of a signal appearing at the top dead centre (or slightly later) and disappearing approximately 30° after the top dead centre.

In U.S. Pat. No. 4,249,494, owned by the Assignees of the present Applicant, there has already been proposed a device which allows the operation of the anti-pinging vibration detector to be started at the suitable time, without relying on a proximity detector or a position detector, by identifying the top dead centre using simply the ignition signal supplied by the distributor. In that Patent Application, the observation was made that the usual ignition curves of internal combustion engines were, on a graph representing the ignition advance angles as ordinates and the engine speeds as abscissae, comprised in a relatively narrow band disposed symmetrically in relation to a straight line passing through the origin as shown in FIG. 1 of the present application; for a given engine rotation speed, the difference between the real ignition shift (advance) and the ignition shift whose value corresponds to that of the above-mentioned straight line, remains within a relatively small maximum error tolerance. This error margin, which is generally less than 10°, corresponds to half of the width of the band wherein the ignition curve is contained, the said width being measured parallel to the axis of the ordinate of the ignition curve. It has therefore been indicated in U.S. Pat. No. 4,249,494 that if the angle corresponding to the centre line defined above was deducted from the ignition timing advance angle, an angular shift was obtained whose average value was zero, that is to say, subject to the said error corresponding to the half width of the band containing the ignition curve, the top dead centre point is obtained. In this way it has been possible, by using the ignition signal, to define a signal which, subject to a margin of error, corresponds to the piston passing through the top dead centre in the appropriate cylinder.

To obtain this "T.D.C." signal, a value proportional to the speed of rotation is deducted from the value of the ignition timing device, that is to say, from the moment when the ignition signal appears, a certain time interval is counted which corresponds to the value given by the above-mentioned centre line, to obtain a signal which, subject to a margin of error, corresponds to passing through the top dead centre point on that cylinder. The interval which should be counted is that corresponding to an angular shift which is proportional to the engine rotation speed, that is to say, it is a constant period. In other words, in U.S. Pat. No. 4,249,494 it has thus been proposed to calculate a constant interval from the ignition signal in order to obtain, within a margin of error, the instant of the piston in that cylinder passing through top dead centre and, on the basis of this indication, the operative period of the anti-pinging detector (corresponding to a predetermined angle of rotation of the engine to define the angular range wherein one wishes the anti-pinging vibration detector to be operative) is determined. This prior device thus comprised a first circuit means or stage which calculated a constant interval from the ignition signal and a second circuit means or stage, in series with the first stage and which, in order to define the end of the operating signal for the vibration detector, counted an interval corresponding to a constant angle of engine rotation.

It has, however, been found that in a certain number of cases, the approximation proposed in U.S. Pat. No. 4,249,494 owned by the Assignees hereof gave a relatively considerable error margin. In fact with the device previously proposed it is necessary to define, for a given ignition curve, a centre line necessarily passing through the origin of the engine characteristic graph giving the angle of ignition advance in terms of the engine rotation speed. Now in this case, for low rotation speed and high rotation speed regimes, the centre line is generally at a considerable distance from the ignition curve and this corresponds to a considerable error between the moment defined for the approximated or "pseudo top dead centre" and the moment of the real top dead centre. It was possible to compensate for this defect by increasing the duration of the angular range of operation of the anti-pinging vibration detector, but in that case a deterioration in the relationship existing between the pinging signal and the base noise will result.

SUMMARY OF THE PRESENT INVENTION

The present invention aims to mitigate the above-mentioned drawback and proposes an electronic device of the type defined above wherein, over the whole range of the engine rotation speeds, the margin of error between the "pseudo top dead centre" defined on the basis of the ignition signal and the real top dead centre is smaller than in the case of the device of U.S. Pat. No. 4,249,494. According to the invention it has been found that the optimum centre line associated with a given ignition curve did not generally pass through the origin of the graph plotting the ignition timing advance against engine rotation speed.

According to the invention, it is therefore proposed to define a periodic anti-pinging vibration detector enabling signal S on the basis of the ignition signal, whose start D corresponds to a time defined using the optimum centre line associated with a given ignition curve. The start D, of this signal S defined on the basis of the ignition signal, gives the start of the angular range of operation of the anti-pinging vibration detector; the end of the angular range is defined by the end of the signal S which is obtained, for instance, after an interval $t_2$ corresponding to a constant angle of engine rotation as proposed in said U.S. Pat. No. 4,249,494. On the ignition curve (advance/engine rotation speed graph), the approximation ignition curve is a straight line which does not pass through the origin and defines, for a given engine rotation speed, an ignition timing advance which is the sum of two terms: on the one hand, a constant ignition advance interval corresponding to the ordinate at zero engine speed of the line in question and, on the other hand, an advance interval which is proportional to the engine rotation speed. If the real ignition curve is compared with a centre line not passing through the origin, it will thus be seen that the shift between the ignition signal and the top dead centre may be assimilated to the sum of two terms:

(a) an interval $t_1$ corresponding to a constant angle of engine rotation, this angle being the one which is defined by the ordinate at the origin of the centre line; and (b) a constant interval $t_0$ corresponding to the gradient of the centre line on the ignition curve (the graph of advance/engine rotation speed).

Thus, in accordance with the invention, it is proposed to count, starting from the ignition signal, an interval T constituted by the sum of intervals $t_0$ and $t_1$ indicated above, in order to define the start of signal S which commands the putting into operation of the anti-pinging vibration detector. It has been found that this procedure for defining the start of the angular range wherein it is desired to identify the pinging is a considerable improvement, particularly for low and high engine rotation speeds, in comparison with the definition which had been obtained by means of the device described in said U.S. Pat. No. 4,249,494 to the (the disclosure of which is included herein in its entirety by reference).

The present invention therefore provides a new industrial product constituted by an electronic device connected to a periodic generator of ignition signals for an internal combustion engine in which the generated ignition signal is in each cycle shifted in relation to the top dead centre of the piston in the cylinder to be subjected to ignition by a value which is variable depending on the engine speed of rotation, said electronic device receiving an input signal and supplying a periodic first signal S whose start D and finish F are in each period positioned in relation to the top dead centre in said cylinder with a predetermined margin of error, said electronic device comprising first circuit means $E_1$ effective to supply a second signal defining the start D of the first signal S but with a time shift in relation to said input signal received by it and second circuit means $E_2$ effective to receive the output from said first circuit means $E_1$ and to generate a signal defining the finish F of said periodic first signal S with a time shift in relation to said input signal received by it, wherein said second signal supplied by first circuit means $E_1$ is displaced in relation to said received input signal by an interval T which is the sum of a constant first interval $t_0$ and of a second interval $t_1$ which corresponds to a constant angle of engine rotation.

In a preferred embodiment, the signal received by the first circuit means $E_1$ is the ignition signal; the first circuit means $E_1$ is formed by two sub stages $E'_1$ and $E''_1$ disposed in series, substage $E'_1$ receiving the ignition signal and comprising a monostable multivibrator, and the substage $E''_1$ receiving the output from substage $E'_1$ and comprising a saw tooth voltage generator associated with a peak detector, the peak voltage obtained by the saw tooth generator being divided and compared with the saw tooth voltage.

The monostable multivibrator $E'_1$ has the function of calculating said first interval $t_0$ starting from the ignition signal; one may therefore adopt for its creation a structure similar to that described in U.S. Pat. No. 4,249,494 for the monostable multivibrator having the same function. In other words, the monostable multivibrator of sub-stage $E'_1$ may be formed by a capacitor which may (a) be charged by a transistor on receipt of the ignition signal and (b) have its charge voltage compared by a constannt voltage comparator to supply a signal at the time when the two compared voltages are equal.

It should, moreover, be noted that the sub-stage $E''_1$ of the first circuit means $E_1$ has the same function as the second stage of the device described in said U.S. Pat. No. 4,249,494, that is to say, that it counts an interval corresponding to a constant angle of engine rotation. Provision may therefore be made for substage $E''_1$ to have a structure which is analogous to that which has been described for the second stage of the device of U.S. Pat. No. 4,249,494. In other words, the saw-tooth voltage generator of substage $E''_1$ may comprise a capacitor which is capable of discharge by a transistor on receipt of the signal coming from substage $E'_1$.

In the device according to the present invention, the second circuit means $E_2$ which defines the end of signal S advantageously ensures, between its input and output signal, a time shift corresponding to an angle of engine rotation. It is therefore clear that the second circuit means $E_2$ may have a structure which is identical with that of substage $E''_1$, that is to say, comprising a saw tooth voltage generator associated with a peak detector, the peak voltage obtained by the saw tooth voltage generator being divided and compared with the saw tooth voltage.

The functions defined above for the first and second circuit means $E_1$ and $E_2$ may, of course, be obtained by any appropriate means other than those given above, in particular by using a microprocessor or a wired logic circuit. In such an embodiment the first circuit means $E_1$ is obtained, for instance, in a microprocessor by means of two substages $E''_1$ and $E'_1$ in series with one another, the substage $E''_1$ comprising a counter which receives the ignition signal and which loads in a memory the value counted during the preceding interval, the said value being divided by a constant divisor in a divider and compared on leaving counter in a comparator. Substage $E'_1$ comprises a count down register which receives the output of substage $E''_1$ and which, on the basis of an initial $t_0$ value, calculates the time, the indication of passing through the zero value being effected in a comparator which supplies on its output the output signal of said first circuit means $E_1$. Provision may be made for $E_1$ to be in series with the second circuit means $E_2$ calculating a period corresponding to a constant angle of engine rotation, such that the said second circuit means $E_2$ has a structure comparable to that of substage $E''_2$ and is obtained within the same microprocessor as said first circuit means $E_1$.

Other objects and advantages of the present invention will more readily be apparent from the following description of two embodiments thereof, given merely by way of purely illustrative and non-restrictive examples, with reference to the accompanying drawings in which:

FIG. 1 shows, for reference purposes, an ignition curve and the corresponding approximation defined in the PRIOR ART represented by the U.S. Pat. No. 2,249,494 of the assignees hereof;

FIG. 3 shows a block circuit diagram of an elctronic device for effecting the approximation defined by FIG. 2;

FIG. 4 shows the signals at various points of the block circuit diagram of FIG. 3.

Figure 1:
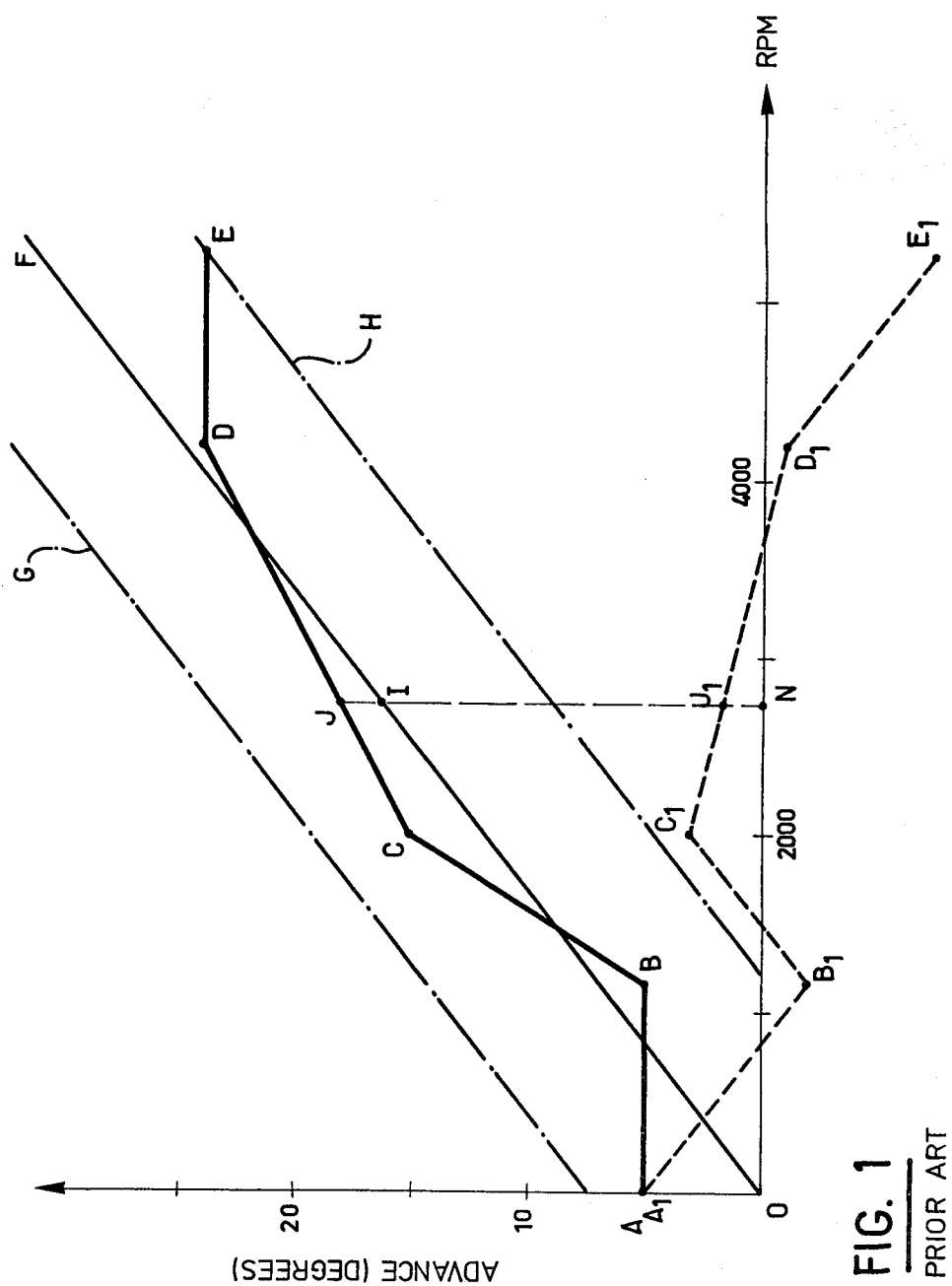

Referring now to FIG. 1, it will be seen that an ignition curve (a plot of ignition timing/engine speed) A, B, C, D, E has been represented on a graph comprising, on the y axis, the ignition advance expressed in degrees and, on the x axis, the engine speed of rotation expressed in r.p.m.

In the prior art constituted by U.S. Pat. No. 2,249,494, it has been proposed to reduce the actual ignition curve by approximation to the straight line OF passing through the origin. In this case, the ignition curve was entirely comprised within an envelope defined between two straight lines G and H parallel to OF and symmetrical to either side in relation to OF. The error made in assimilating the ignition curve to the straight line OF may at most be equal to the distance between the straight line OF and one or other of the two straight lines G or H, measured in a direction parallel to the y axis; for a given engine rotation speed N the error corresponded to the segment IJ. If, for every point such as J or the ignition curve, there is deducted from the ordinate of the said points J the ordinate of the corresponding point I of the straight line OF (the approximated ignition timing point for the same engine speed N), there is defined on the basis of the ignition curve, a curve $A_1$, $B_1$, $C_1$, $D_1$, $E_1$. If $J_1$ is the point of this curve corresponding to point J of the actual ignition curve, the ordinate of $J_1$ represents the timing shift in relation to the top dead centre (zero advance) when a constant time interval (corresponding to the ordinate of point I) is counted from the ignition signal (corresponding to point J). In other words, if a constant time interval period is counted from the ignition signal, the obtained approximation to the top dead centre is the better the closer the curve $A_1$, $B_1$, $C_1$, $D_1$, $E_1$ is to the x axis. It will, however, be seen from FIG. 1 that this curve diverges quite considerably from the x axis, particularly for low and high engine speeds of rotation.

Figure 2:
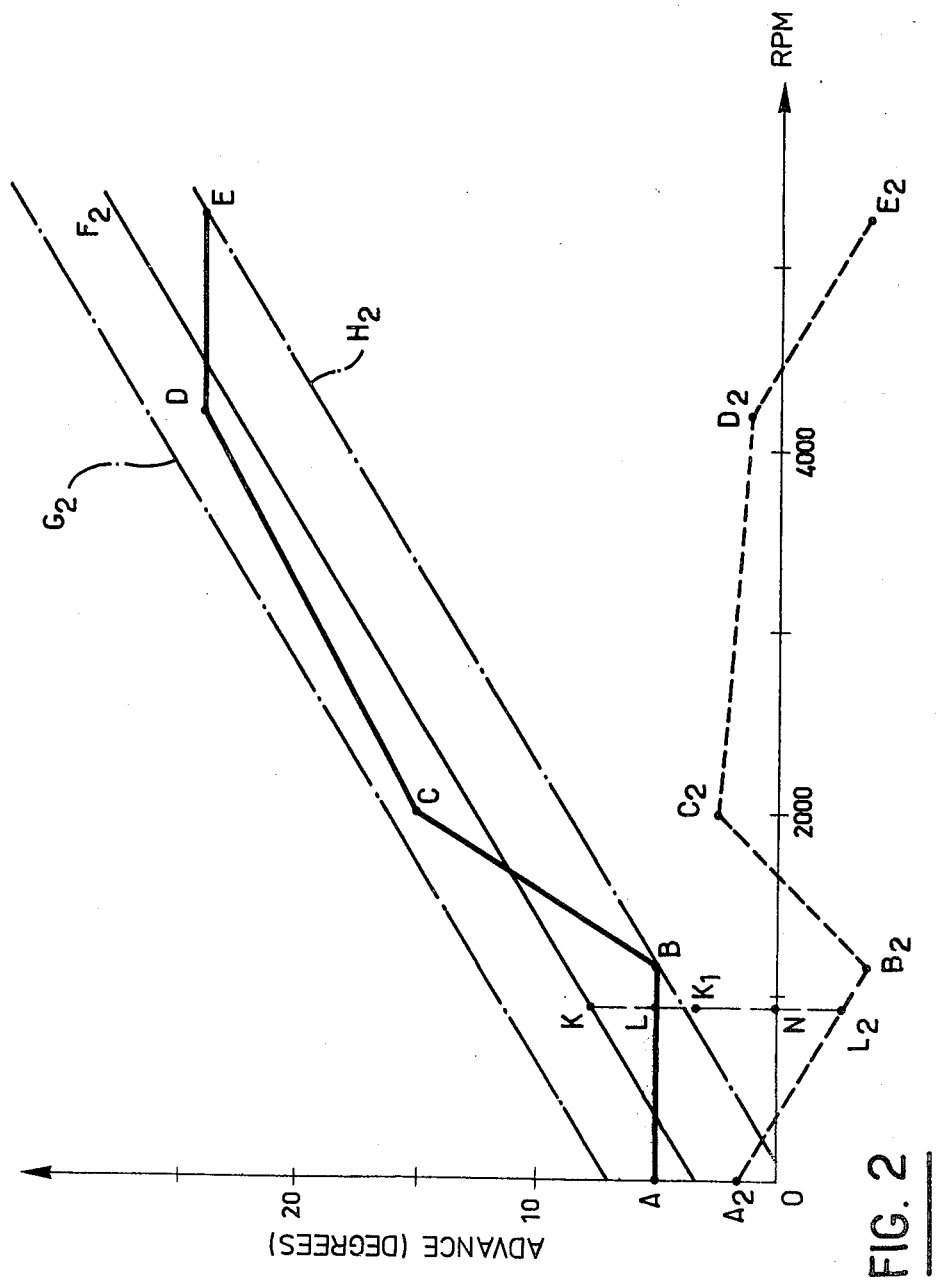
FIG. 2 shows the same ignition curve as on FIG. 1, but with the approximation centre line in accordance with the present invention.

In FIG. 2, there has been shown a graph which is analogous to that of FIG. 1 carrying an identical ignition curve A, B, C, D, E. The straight line approximation, $F_2$, of the ignition curve is the centre line of an envelope whose maximum divergence is as small as possible. It will be seen that this centre line $F_2$ does not pass through the origin. Two symmetrical straight lines $G_2$ and $H_2$ are defined in relation to $F_2$ which is parallel to them, the ignition curve being altogether comprised within the narrow envelope $G_2$–$H_2$. The maximum error which is made by assimilating the ignition curve to straight line $F_2$ is equal to the distance between $F_2$ and either $G_2$ or $H_2$, in a direction measured parallel to the y axis.

It will be found that this maximum error is smaller than that corresponding to the graph of FIG. 1, thus demonstrating the advantage of the method which is employed by the device according to the present invention. If, for a given engine rotation speed N, there is deducted from the ordinate of the point L of the actual ignition curve, the ordinate of point K on the straight line $F_2$ approximating the ignition curve, there is defined a point $L_2$, and the locus of point $L_2$ corresponds to the curve $A_2$, $B_2$, $C_2$, $D_2$, $E_2$ transformed from the ignition curve A, B, C, D, E. The ordinate of point $L_2$ corresponds to the timing shift in relation to the top dead centre (zero advance) when, after receipt of the ignition signal corresponding to point L, a time interval corresponding to the ordinate of point K has been counted.

It is clear that the approximation of the top dead centre by the calculation indicated above is the better the closer curve $A_2$, $B_2$, $C_2$, $D_2$, $E_2$ is to the x axis, and it will be found that this curve is effectively closer than the corresponding curve represented on FIG. 1. The time interval which corresponds to the ordinate of point K on FIG. 2 is constituted by two terms: namely one interval $t_1$ which corresponds to the ordinate of straight line $F_2$ for zero speed, and a second interval $t_0$ which corresponds to the vertical distance $KK_1$, where $K_1$ has the same ordinate as the ordinate of line $F_2$ for zero speed. The interval corresponding to $KK_1$ is the interval which corresponds to an angular timing shift directly proportional to the speed of rotation, that is to say it represents a constant time interval. In other words it will be seen that, in the case of FIG. 2, to obtain the approximation of the top dead centre corresponding to curve $A_2$, $B_2$, $C_2$, $D_2$, $E_2$, it is sufficient to start from the ignition signal, to count firstly a constant interval $t_0$ and secondly an interval $t_1$ corresponding to a constant angle of engine rotation.

FIG. 3 is a block circuit diagram of a device for effecting the approximation of the top dead centre point according to the graph of FIG. 2.

The device shown comprises, in series, first circuit means in the form of a first stage $E_1$ and second circuit means in the form of a second stage $E_2$. Stage $E_1$ receives the ignition signal at point M. Stage $E_2$ supplies at point T the output signal S of the device; this output signal S is a periodic rectangular pulse signal, the start of the rectangular pulse corresponding to the top dead centre (save for the error of approximation) and the end of the signal corresponding to completion of a constant angle of rotation of the engine after the top dead centre.

The stage $E_1$ supplies at point V data defining the beginning of signal S, and stage $E_2$ defines the end of signal S. The detail of stage $E_2$ has not been shown since it is known, for instance from the U.S. Pat. No. 3,777,559, how to make an electronic stage effective to calculate a period corresponding to a constant angle of engine rotation on the basis of data signifying the start of the signal. The ignition signal received by Stage $E_1$ at M is represented in the first (top) line of FIG. 4.

The input signal at M is sent to a pulse shaping circuit 1 which delivers, at the input of a monostable multivibrator 2, the signal represented in the second line of FIG. 4.

At the moment of the descending front of the signal supplied by the pulse-shaping circuit 1, the monostable multivibrator 2 produces on its output a rectangular voltage pulse of duration $t_0$. The output signal of monostable multivibrator 2 is represented on the third line of FIG. 4.

The combination of pulse-shaping circuit 1 and monostable multivibrator 2 constitutes the substage $E'_1$ of stage $E_1$, and the signal leaving this substage has a descending front which is phase-shifted by a constant interval $t_0$ in relation to the ignition signal. The output signal of substage $E'_1$ is sent to a saw tooth voltage generator 3 whose output voltage is represented on the fourth line of FIG. 4.

Saw tooth voltage generator 3 feeds a peak detector 4 which supplies at its output a voltage corresponding to the maximum voltage that had appeared on its input. The resetting to zero of the voltage supplied by the saw tooth voltage generator 3 is effected by the descending front of the signal emitted by monostable multivibrator 2. The output voltage from the peak detector 4 is represented on the fifth line of FIG. 4.

This output voltage is applied to a voltage divider 5 which supplies a voltage equal to a predetermined fraction of its input voltage; the output signal from the voltage divider 5 is represented on the sixth line of FIG. 4.

The output voltage divider 5 is compared with the voltage supplied by the saw tooth voltage generator 3, by means of a comparator 6. At the output from comparator 6, a signal is available which is represented on the seventh line of FIG. 4: it is a periodic, rectangular pulse signal, with the rising front of each rectangular pulse synchronous with the ignition signal and the descending front occurring when the two voltages received by comparator 6 are equal.

Now, starting from the start of a saw tooth pulse supplied by the saw tooth voltage generator 3, the equality is obtained after a determined fraction of the period of the ignition signal, the said fraction corresponding to the division factor applied by voltage divider 5; this fraction of the period is thus a constant angle and it will be seen that the equality of the voltages arriving on comparator 6 is obtained after elapse of an interval $t_1$ (after generator 3 has been reset to zero) corresponding to a constant angle of engine rotation. In other words, the signal supplied by the comparator 6 will be constituted by a rectangular pulse whose rising front is synchronous with the ignition signal and whose descending front is separated from the rising front by an interval $T = t_0 + t_1$.

If the device which has been described above is used for "enabling" an antivibration detector associated with the internal combustion engine whereto the device is connected (for "pinging" detection), the signal obtained at V thus defines by its descending front the start of the angular range wherein the vibration detector is to be operative. Stage $E_2$ calculates, commencing from this start, a period $t_2$ corresponding to a constant angle of engine rotation. The structure of the stage $E_2$ may be strictly analogous to that of substage $E''_1$ of stage $E_1$.

It has been found that the approximation obtained by means of stage $E_1$ of the device according to the invention, is clearly more satisfactory than that of the prior art device constituted by U.S. Pat. No. 4,249,494.

Figure 5:
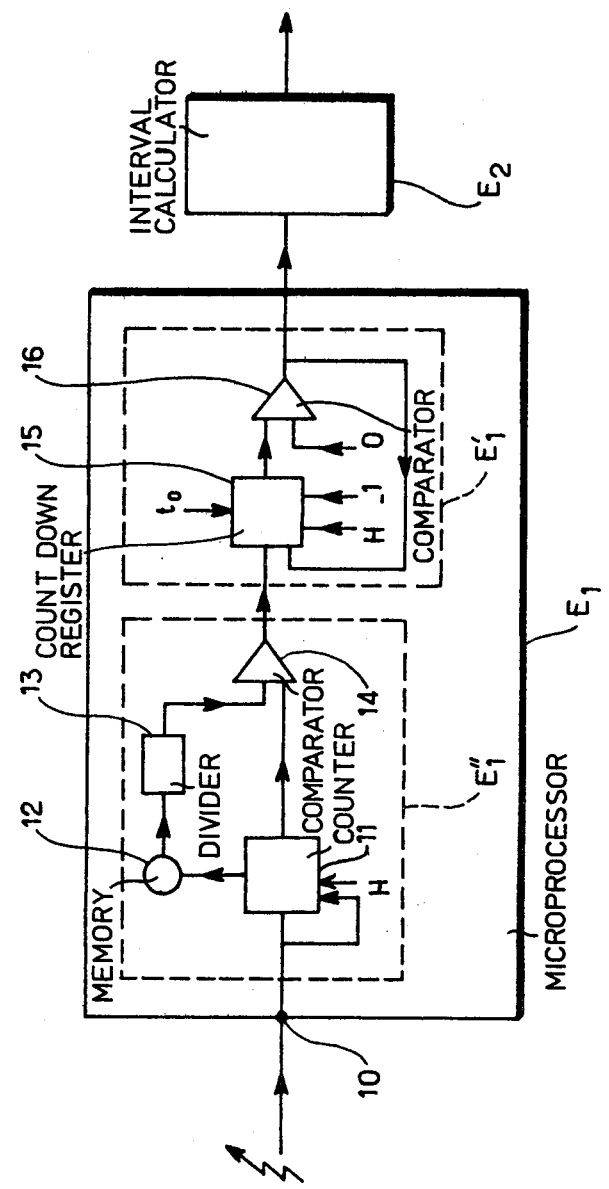
FIG. 5 represents schematically a device according to the invention incorporated in a microprocessor.

The variant represented in FIG. 5, uses a microprocessor which itself constitutes stage $E_1$ (the first circuit means) of the device. In this embodiment, the microprocessor receives at 10, the signal corresponding to the instant of ignition, thus making it possible to load in a memory 12 the contents obtained by a time counter 11, to reset the said counter 11 to zero, and to cause the contents of counter 11 to grow from zero at the rate of its associated clock timer H. The contents of memory 12 are divided by a constant factor in a divider 13 and applied to a zone 14 having the function of a digital comparator. Zone 14 receives the output from divider 13 and the output of counter 11. When these compared outputs are equal, the comparator zone 14 supplies a signal on its output. It will be seen that in this way the counting of a constant fraction of the interval is effected, on the basis of the arrival of the signal at point 10, because the contents of memory 12 are equal to the value counted during the preceding interval. There is thus obtained the time count corresponding to a constant angle of engine rotation.

This subassembly of functions in the microprocessor constitutes a first substage $E''_1$ analogous to the second substage $E''_1$ of FIG. 3.

The output of this substage $E''_1$ actuates a count down register 15 which, on receipt of a signal, is charged to a predetermined value $t_0$. The count down register 15 decreases the initial value $t_0$ charged therein, at the rate of its associated clock timer H, and it supplies on its output a value which, with respect to time, progressively decreases from the initial value of $t_0$ down to zero value. This output value is detected in zone 16, which has the function of a digital comparator, where it is compared with the zero value and, at the time of equality therewith, the comparator 16 supplies on its output a signal to stop the count down register 15. Zones 15 and 16 thus constitute a substage $E'_1$, whose function it is to count a constant time interval $t_0$ starting from the signal supplied by the substage $E''_1$. In other words, the substage $E''_1$ of the microprocessor counts, starting from the ignition signal, an interval $t_1$ corresponding to a constant angle of engine rotation, and substage $E'_1$ counts a constant interval $t_0$. The signal supplied by stage $E_1$ may, as in the preceding embodiment, be sent to a stage $E_2$ which calculates, on the basis of the signal received, an interval $t_2$ corresponding to a constant angle of engine rotation. The structure of stage $E_2$ may be strictly analogous to that of substage $E''_1$, and therefore the assembly of stages $E_1$ and $E_2$ may be obtained within the same microprocessor.

It shall be duly understood that the embodiments described above are in no way restrictive and may give rise to any desirable modifications without thereby departing from the scope of the invention as defined by the claims.

I claim:

1. In an electronic device connected to a periodic generator of ignition signals for an internal combustion engine in which the generated ignition signal is displaced in each cycle in relation to the top dead centre of the piston in the cylinder to be subjected to ignition, by a value which is variable according to the engine speed of rotation, said electronic device receiving an input signal and supplying a periodic first signal whose start and finish are, in each period, positioned in relation to the top dead centre in said cylinder with a predetermined error margin, said electronic device comprising first circuit means effective to supply a second signal defining the start of the first signal but with a time shift in relation to said input signal and second circuit means effective to receive the output second signal from said first circuit means and to generate a third signal which defines the finish of said periodic first signal with a time shift in relation to said input signal, the improvement wherein said second signal supplied by said first circuit means is displaced in relation to said input signal by an interval which is the sum of a constant first interval and of a second interval which corresponds to a constant angle of engine rotation.

2. A device according to claim 1, wherein said input signal to said first means is said generated ignition signal.

3. A device according to claim 2, wherein said first circuit means consists of first and second substages disposed in series, wherein said first substage receives said generated ignition signal and comprises a monostable multivibrator, wherein said second substage receives the output from said first substage and comprises a saw tooth voltage generator, a peak detector connected to said saw tooth voltage generator to isolate the peak detector voltage thereof, a divider for dividing the detected peak voltage of the saw tooth voltage generator and a comparator effective to compare the divided voltage from said divider with the saw tooth voltage generated by said saw tooth generator.

4. A device according to claim 3, wherein said monostable multivibrator of said first substage is constituted by means for receiving a constant voltage, a transistor, a voltage comparator, and a capacitor which is arranged to be discharged by the transistor on receipt of said ignition signal by said transistor and whose charge voltage is compared by said voltage comparator to a constant voltage received by said voltage receiving means, said voltage comparator being effective to deliver a fourth signal at the instant the two compared voltages are equal.

5. A device according to claim 3 or 4, wherein said saw tooth voltage generator of said second substage comprises transistor means and capacitor means capable of being discharged by said transistor means on receipt of said third signal delivered by said first substage.

6. A device according to any one of claims 1 to 4, wherein said second circuit means is effective to effect a time shift, between said second signal which it receives as input and said third signal which it delivers as output, corresponding to a constant angle of engine rotation.

7. A device according to claim 6, wherein said second circuit means comprises saw tooth voltage generator means, voltage peak detector means responsive to the saw tooth output of said saw tooth voltage generator means, divider means for dividing the voltage of the peaks of the saw tooth voltage generator means and voltage comparator means effective to compare the divided peak voltage of said divider means with the saw tooth voltage generator means.

8. A device according to claim 1, and including a microprocessor defining first and second substages of said first circuit means, said first and second substages being connected in series with one another, wherein said first substage comprises a counter effective to receive the said generated ignition signal and a memory connected to said counter to receive the value counted during the preceding period, a divider effective to divide said counted value by a constant divisor and a first comparator effective to compare a reference value with the value leaving said counter, and wherein said second substage comprises a count down register which receives the output from said first substage, and which, starting from an initial value, counts down the time; and a second comparator effective to receive the count down time signal from the count down register and to identify the instant of equality of said count down register with a zero value by supplying on its output said second signal when said count down register signal equals zero.

9. A device according to claim 8, wherein said first circuit means and said second circuit means in series therewith are both defined within a single microprocessor, and wherein said second circuit means calculating a time interval corresponding to a constant angle of engine rotation has a structure which is comparable to that of said first substage of said first circuit means of the microprocessor.

10. A device according to any one of claims 1 to 4, 8 and 9 in combination with means responsive to said first periodic signal for controlling a vibration detector to be activated for operation throughout the whole duration of the said first periodic signal.

11. A device according to claim 10, wherein said vibration detector whose operation is commanded by the said device, is effective to identify the occurrence of pinging during operation of the internal combustion engine associated with the device.

* * * * *